Figure 1:
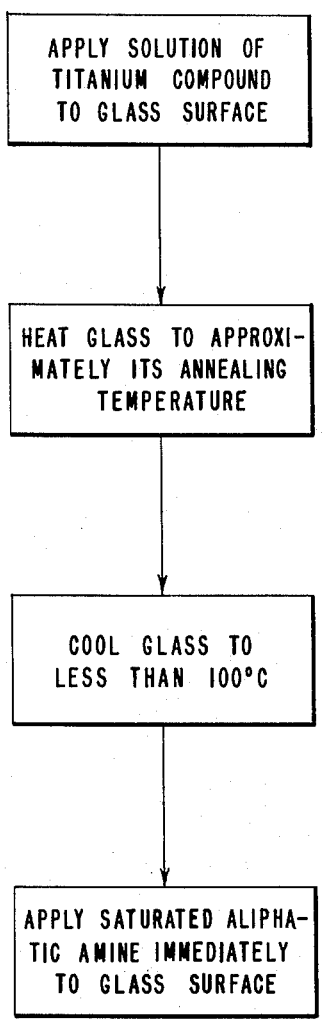

Dec. 15, 1964  R. H. DETTRE ETAL  3,161,537
PROCESS FOR INCREASING THE SCRATCH RESISTANCE OF GLASS
Filed Dec. 22, 1961

INVENTORS
ROBERT HAROLD DETTRE
JERRY ALLEN NELSON

BY *Francis J. Crawley*

ATTORNEY 3,161,537
PROCESS FOR INCREASING THE SCRATCH
RESISTANCE OF GLASS
Robert Harold Dettre, Brandywine Hundred, and Jerry
Allen Nelson, Newark, Del., assignors to E. I. du Pont
de Nemours and Company, Wilmington, Del., a corporation of Delaware
Filed Dec. 22, 1961, Ser. No. 161,418
6 Claims. (Cl. 117—69)

This invention relates to an improved process for increasing the scratch resistance of glass bodies.

The problem and importance of scratch resistance in glass are discussed in detail by Deyrup in U.S. Patent 2,831,780. It is a practical industrial problem and relates to such items as the weakening of glass bottles by rubbing against each other in transit, the marring of window glass through scratches by impinging dust or glass fragments, and the weakening of textile glass fibers by mutual abrasion.

In said patent, Deyrup offers a method for overcoming this deficiency of glass by treating the same with the vapors of a metallo-organic compound at a temperature between the lowest annealing temperature of glass and the temperature at which excessive deformation occurs.

In copending application Serial No. 58,616 (now U.S. Patent 3,051,593) and U.S. Patent No. 3,004,863 of C. L. Gray and R. H. Dettre, processes are described and claimed wherein glass articles are treated with an aqueous solution of certain water-soluble and water-stable ester derivatives of titanium, following which the glass articles are passed through an annealing oven wherein they are heated to a temperature at or near the annealing point, and then allowed to cool to essentially room temperature. Still a third type of titanium compounds is employed in copending application of Brockett, Dettre and Gray, Serial No. 97,757.

All these processes have the one feature in common that a titanium oxide film is eventually formed in contact with the glass surface which is probably bonded, partially or completely, with the material of the glass through Ti—O—Si links.

As a final step, however, in all the aforegoing processes the articles must be allowed to stand in open air for a period not less than 20 or 30 minutes. Until after this standing period in air, the scratch resistance effect does not seem to develop fully. And although Deyrup has not recognized or taught it in his patent, a standing period in air is essential in his process, too, if a complete and reliable development of the scratch resistant effect is desired.

As has been pointed out in U.S. Patent 3,051,593, the standing in open air for 20 minutes before use is apt to occur automatically with almost any glass article. Nevertheless, the standing step takes on a positive aspect, often with uneconomical side features, when one considers belt line production of articles such as milk bottles. The standing step demands that the belt line be held still for 20 minutes or more so as not to give the bottles a chance to scratch each other in motion before their scratch-resistant coating has become fixed. Where the article produced must be of relatively small cost, such holding up period becomes a matter of material economic significance.

Furthermore, the required length of the standing period may vary from one treatment to another (depending on the type of titanium compound selected for the treatment and perhaps also on the temperature and mode of application of the annealing treatment) and therefore often presents problems in control of the process, inasmuch as one cannot readily determine by mere inspection of the articles whether they have or have not received the proper length of air-curing.

It is accordingly an object of this invention to modify the aforementioned processes of imparting scratch resistance of glass bodies, whereby to eliminate the need of holding the treated bodies still in air for a determined period of time after annealing, and to substitute therefor a positive chemical treatment. Other objects and achievements of this invention will become apparent as the description proceeds.

Now, according to our present invention, the curing period is replaced by a treatment with certain chemical agents as defined below, which treatment can be achieved quickly by immersion, spraying or otherwise coating the annealed glass article with, an aqueous solution, an organic solvent solution, a melt or even vapors of said chemical agents.

Reference is made to the attached drawing which illustrates by a flow sheet diagram the process of the present invention.

Figure 2:
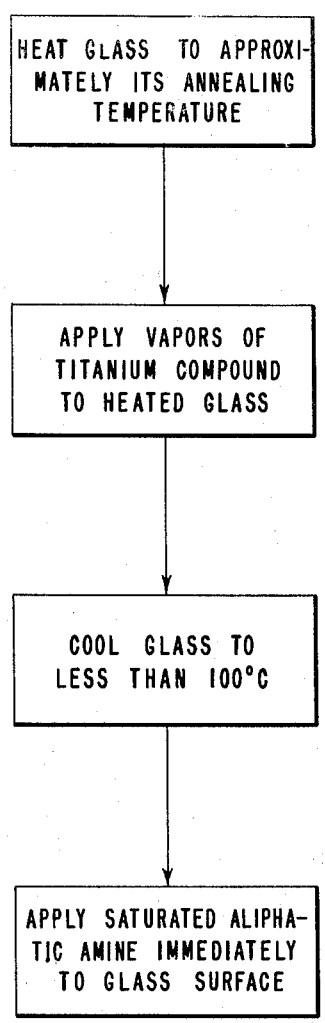

FIGS. 1 and 2 are alternative processes which differ only with respect to the manner of applying the titanium organic compound. In FIG. 1, a solution of the titanium compound is applied to the glass prior to heating; whereas, in the alternative process of FIG. 2, vapors of a titanium compound are applied to the heated glass. The last two steps in the processes of both FIGS. 1 and 2 are the same.

We have found that glass articles which have been treated with organic titanium compounds and annealed according to the aforementioned patents and copending application become satisfactorily scratch resistant if the annealing is followed up with a step of treating said articles with a polar nitrogenous compound having one or more long chains of saturated aliphatic C-atoms in its structure. In other words, the nitrogenous compound may be the free base form, salt form or quaternary compound of an aliphatic or cycloaliphatic amine selected from the group of primary, secondary and tertiary amines defined by the formulas

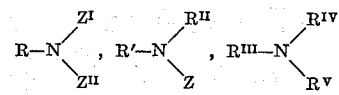

and

wherein Z, $Z^I$ and $Z^{II}$ represent hydrogen or a lower alkyl radical (of 1 to 6 C-atoms), Y is a divalent, saturated, aliphatic radical of 4 to 6 C-atoms which completes a ring with the N-atom above shown, R is a saturated, aliphatic radical of 12 to 22 C-atoms (including in this phrase straight-chain, branched chain and cycloaliphatic radicals), but possesses in its structure a continuous hydrocarbon chain of at least 12 C-atoms; $R^I$ and $R^{II}$ are saturated aliphatic radicals which possess each at least one continuous hydrocarbon chain of at least 10 C-atoms, while $R^{III}$, $R^{IV}$ and $R^V$ are saturated aliphatic radicals which possess each at least one continuous hydrocarbon chain of at least 8 C-atoms.

As readily available illustrations of amines of the above four types may be mentioned:

Dodecylamine, tetradecylamine, hexadecylamine, heptadecylamine, octadecylamine, eicosylamine and docosylamine;

Methyl - dodecylamine, dimethyl - dodecylamine, dimethyl - tetradecylamine, dimethyl - hexadecylamine and dimethyl-octadecylamine;

Didecylamine, didodecylamine, etc., up to and including dioctadecylamine;

Methyl - didodecylamine, methyl - ditetradecylamine, etc., up to and including methyl-dieicosylamine;

Trioctylamine, tridecylamine, etc., up to and including trioctadecylamine;

N - dodecyl - pyrrolidine, N - tetradecyl - piperidine, N-octadecyl-morpholine and N-octadecyl-piperazine;

Octadecyl-2-aminoethyl ether, $C_{18}H_{37}$—$OCH_2CH_2NH_2$;

18-ethoxy-1-octadecylamine, $CH_3CH_2O$—$C_{18}H_{37}NH_2$; and 1,18-octadecylene-diamine, $H_2N$—$C_{18}H_{36}$—$NH_2$.

As commercially available or conveniently preparable salts of the above amines may be mentioned the hydrochlorides, hydrobromides, nitrates, sulfates, phosphates and acetates.

As practical illustrations of quaternary derivatives may be taken the reaction product of any of the above amines with any commercially available quaternizing agent, for instance dimethyl sulfate, methyl or ethyl chloride, methyl or ethyl bromide, methyl or ethyl iodide, methyl-p-toluene sulfonate, benzyl chloride, and the like.

The application of the above nitrogenous compounds to glass in accordance with this invention may be achieved by three distinct methods.

All three start with a titania coated glass article obtained by the method of the aforementioned patents or that of the aforementioned copending application. The coated glass surface is then either (1) dipped into an aqueous or organic solvent solution of one of the above defined compounds, (2) dipped into the liquid melt of one of these compounds, or (3) exposed to the vapors of one of these compounds. Of course, mixtures of compounds may also be used. When using the vapor method, it is not necessary that the agent be at reflux temperature; inasmuch as there is sufficient material present in vapor form over a melt to complete the process. The vapor method is, however, somewhat slower than the other two and the latter are therefore preferred.

Typical commercial operations, including application of the titania coating, are illustrated in the following examples.

EXAMPLE I

*Aqueous and Organic Solvent Solutions*

Following the procedure of U.S. Patent 3,051,593 to Gray and Dettre, glass bottles are dipped into a 10% aqueous solution of triethanolamine titanate (prepared according to Bostwick, U.S. Patent 2,824,114) and the excess solution is allowed to drain from the surface. Alternatively, the solution may be applied to the glass surface as a fine spray. The wetted bottles are then slowly heated to 650° C. in an annealing lehr and then cooled slowly to near ambient temperature. On issuing from the lehr, the bottles are dipped into (or sprayed with) a 1% aqueous solution of n-dodecylamine hydrochloride and allowed to drain.

The bottles thus obtained are immediately scratch resistant as may be demonstrated by rubbing two such bottles together with no apparent effect. (If two bottles are rubbed together immediately after leaving the lehr but before treating with the amine solution, they scratch each other readily.)

The n-dodecylamine hydrochloride solution used above can be replaced by any of the following solutions, with equally successful results.

| Compound | Solvent | Concentration, percent |
|---|---|---|
| N-Trimethyldodecyl ammonium bromide | $H_2O$ | 1 |
| Trioctylamine hydrochloride | $H_2O$ | 1 |
| N-methyl didecylamine hydrochloride | $H_2O$ | 0.25 |
| Dioctadecylamine hydrochloride | $H_2O$ | 0.5 |
| N,N-dimethyloctadecylamine hydrochloride | $H_2O$ | 0.25 |
| Hexadecylamine hydrochloride | $H_2O$ | 0.25 |
| N-methyl heptadecylamine hydrochloride | $H_2O$ | 0.25 |
| N,N-dimethyloctadecylamine | Cetane | 0.24 |
| Dioctadecylamine | Cetane | 0.24 |
| Hexadecylamine | Cetane | 0.24 |
| N,N-dimethyloctadecylamine | Cetane | 2.0 |

The glass objects treated with nonaqueous solutions are rinsed with water. This merely removes any excess material which may be present and is not essential to the process.

EXAMPLE II

*Melt*

Using the procedure of Example I for forming the titania coating on the glass surface, the glass articles are removed from the lehr on reaching the melt temperature of one of the compounds indicated below and dipped into a melt of said compounds. They are then allowed to drain and cool, if necessary, and are rinsed with water. The glass surfaces are immediately scratch resistant.

Compound: Temperature of melt, ° C.
  Dodecylamine ------------------------------ 40
  N-methyl didecylamine --------------------- 25
  Hexadecylamine ---------------------------- 80
  N,N-dimethyloctadecylamine ---------------- 35
  Dioctadecylamine -------------------------- 80

It will be noted that the melt temperatures vary considerably, and the temperature to which the glass objects are cooled in the lehr before the above curing treatment are correspondingly varied.

EXAMPLE III

*Vapor Application*

Using the procedure described in Example I for forming the titania coating on the glass surface, the cooled bottles are passed slowly over a vessel which contains one of the following materials at the temperature indicated. The bottles are then cooled, rinsed with water and are immediately scratch resistant. Again, the water rinse is not an essential part of the process.

Compound: Temperature, ° C.
  Dodecylamine ------------------------------ 88
  Hexadecylamine ---------------------------- 100
  N,N-dimethyloctadecylamine ---------------- 120
  Dioctadecylamine -------------------------- 120

In the above examples, the treatment prior to annealing was done with triethanolamine titanate, in accordance with U.S. Patent 3,051,593 to Gray and Dettre. Equally successful results are obtained if this treatment is done with an aqueous solution of diisopropyl diacetoacetonyl titanate (as in the Gray and Dettre patent, No. 3,004,638), or with an aqueous solution of a water-soluble titanium lactate complex (as in copending application of Brockett, Dettre and Gray, Serial No. 97,757), or with vapors of tetraisopropyl titanate (as in Deyrup, U.S. Patent 2,831,780), or again if the bottles are dipped in or sprayed with heptane solutions of dihydroxy-bis(2-ethyl-1,3-hexanediol) titanate, poly(dibutyl titanate) or tetrakis(2-ethyl-1,3-hexanediol)titanate and then heated to the annealing temperature as taught in the above mentioned references. None of these methods produce glass surfaces which are scratch resistant immediately on leaving the annealing lehr but they become so on treatment according to this invention.

As an added advantage of the treatment constituting this invention, it has been found that glass articles produced by the present process are more scratch resistant than those produced by the methods of the aforementioned patents and copending application, even though the air-curing step above described has been applied to the titanium-treated glass.

The resistance to scratching of a glass surface can be measured by drawing a glass rod across the surface and measuring the weight or tension which must be applied to the rod to produce a scratch. In this manner, the higher scratch resistance produced by the present process can be readily demonstrated.

Treatment with the special agents of this invention of a glass object which does not have a preformed titania coating with the compounds defined in the aforementioned patents or in said copending application, imparts to said glass objects a hydrophobic surface but not scratch resistance to any degree.

The scratch resistant glass surfaces produced according to the present invention are durable to washing with water, but not to washing with aqueous solutions of anionic detergents, such as the alkali metal salts of long chain alkyl sulfates or alkyl or alkaryl sulfonates. However, where an article has been washed with such a detergent, the scratch-resistant surface thereon can be reformed by treating the article again, in one of the aforegoing manners, with one of the nitrogenous agents mentioned in this specification. (In other words, the curing treatment is repeated on the washed article, but there is no need for repeating the treatment with a titanium ester or the annealing operation.)

It will be understood that the details of procedure above set forth may be varied widely within the skill of those engaged in this art.

For instance, the temperature to which the glass is allowed to cool in the annealing lehr need not drop below the temperature at which the curing treatment is intended to be applied, and may indeed be considerably higher so long as there is no danger of shattering the glass object by abrupt cooling during the curing treatment. Altogether, the various modes of application of the curing treatment of this invention may vary in temperature from room temperature to 150° C., while the temperature of the glass just prior to the curing treatment may be some 50° C. higher than the temperature of the applied solution, melt or vapor.

In lieu of cetane in the procedure of Example I, any economically available organic liquid may be employed which dissolves the particular curing agent selected. In general, the higher boiling hydrocarbons are the preferred organic solvents, but others, such as alcohols and acetone, can be used, provided that the curing agent is soluble therein. The vapor pressure of an agent used in the vapor treatment need not be high; 0.1 atm. is generally sufficient, but higher vapor pressures can be used and usually will be found to speed up the process.

We claim as our invention:

1. In a process for increasing the scratch resistance of glass by applying an organo-titanium compound to the surface of the glass, which is in non-fibrous form, heating the glass, and then allowing the glass to stand in air for a period of not less than 20 minutes to develop the desired scratch resistance, the improvement which comprises eliminating the standing period required to develop scratch resistance by coating the surface of the glass, immediately after the heating step and at a temperature between room temperature and 150° C., with a nitrogenous compound selected from the group consisting of aliphatic and cycloaliphatic amines, their salts and quaternary derivatives, said amines being compounds of the formulas

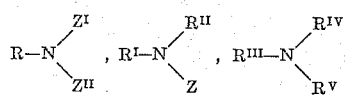

and

wherein $Z$, $Z^I$ and $Z^{II}$ represent members of the group consisting of hydrogen and lower alkyl of 1 to 6 C-atoms, $Y$ is an alkylene radical of 4 to 6 C-atoms, $R$ is an alkyl radical of 12 to 22 C-atoms having a straight chain of at least 12 C-atoms, $R^I$ and $R^{II}$ are alkyl radicals of 10 to 22 C-atoms, having a straight chain of at least 10 C-atoms, while $R^{III}$, $R^{IV}$ and $R^V$ are alkyl radicals of 8 to 22 C-atoms, having a straight chain of at least 8 C-atoms.

2. The process of claim 1 wherein the nitrogenous compound is n-dodecylamine hydrochloride.

3. The process of claim 1 wherein the nitrogenous compound is applied to the glass from an aqueous solution of said compound.

4. The process of claim 1 wherein the nitrogenous compound is applied to the glass from a solution of said compound in an organic solvent.

5. The process of claim 1 wherein the nitrogenous compound is applied to the glass in molten form.

6. The process of claim 1 wherein the nitrogenous compound is applied to the glass in vapor form.

References Cited in the file of this patent

UNITED STATES PATENTS

| | | |
|---|---|---|
| 2,356,542 | Sloan | Aug. 22, 1944 |
| 2,563,289 | Steinman | Aug. 7, 1951 |
| 2,584,763 | Waggoner | Feb. 5, 1952 |
| 2,671,033 | Waggoner | Mar. 2, 1954 |
| 2,991,196 | Biefeld | July 4, 1961 |
| 3,004,863 | Gray et al. | Oct. 17, 1961 |
| 3,051,593 | Gray et al. | Aug. 28, 1962 |